March 1, 1938.  A. BRAUN  2,109,817
DISTANCE HOLDER FOR ELECTRIC SIGNALING CABLES
Filed Oct. 28, 1936
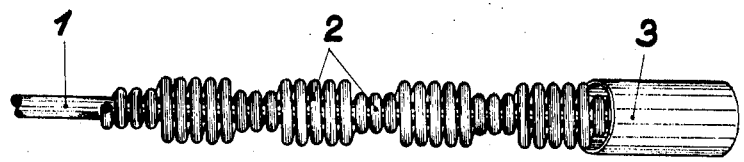

Patented Mar. 1, 1938

2,109,817

UNITED STATES PATENT OFFICE 2,109,817

DISTANCE HOLDER FOR ELECTRIC SIGNALING CABLES

Alfred Braun, Cologne-Mulheim, Germany, assignor to Felten & Guilleaume Carlswerk Actien-Gesellschaft, Cologne-Mulheim, Germany Application October 28, 1936, Serial No. 108,055
In Germany November 27, 1935

2 Claims. (Cl. 173—265)

It is known in the production of air space insulation for signaling cables to use threads of rigid insulating substances, more particularly polystyrol, which are helically wound on the conductor and support a covering consisting of wound bands, for instance of artificial materials, with respect to the conductor.

In order further to reduce the capacity, and the dielectric losses of such an air space insulated cable, according to the invention, use is made of a distance holder helically surrounding the conductor and consisting of a rigid thread of insulating material, which is so wound that the diameter of the helix, which is several times greater than the diameter of the conductor, is reduced to the diameter of the conductor in sections. The helix sections with the larger diameter thus carry the covering of the conductor, and those with the smaller diameter, which is equal to the diameter of the conductor, carry the conductor.

In the accompanying drawing, $a$ is the conductor, $b$ the helix with the sectionally varying diameter and $c$ the covering of the conductor.

The helices according to the invention may be easily produced by winding the thread alternately on the conductor and on a suitable hollow mandrel.

Naturally, the said helices may be wound with a plurality of threads instead of one, in a manner known per se.

What I claim is:—

1. In signaling cables having a conductor and a cable covering, a helical distance holder of artificial insulating material concentrically surrounding the conductor and comprising sections the inner diameter of which is equal to that of the conductor and which rest on the conductor and, alternating therewith, sections the outer diameter of which is several times greater than that of the conductor and which serve as a support for the cable covering.

2. In the manufacture of signaling cables, the method of forming a helical distance holder of insulating material, between a conductor and a covering of the cable, consisting in winding sections of the said helical distance holder directly on the conductor, so that they rest thereon, and alternating therewith, sections thereof of substantially larger diameter on a hollow mandrel, so as to serve as a support for the cable covering.

ALFRED BRAUN.